C. TRUMAN.
DIE AND TAP HOLDER FOR THREADING DEVICES FOR AUTOMATIC SCREW MACHINES.
APPLICATION FILED APR. 9, 1908.
985,231.
Patented Feb. 28, 1911.
2 SHEETS—SHEET 1.
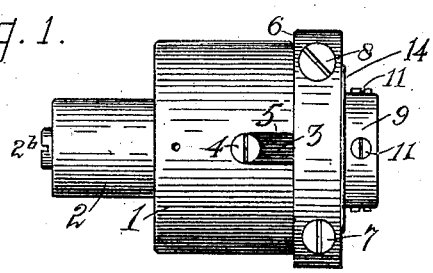
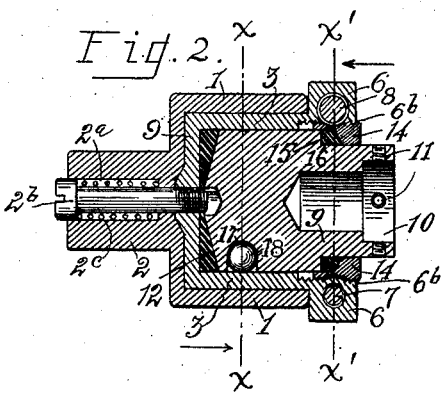 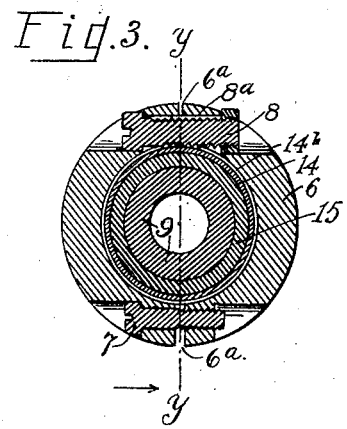
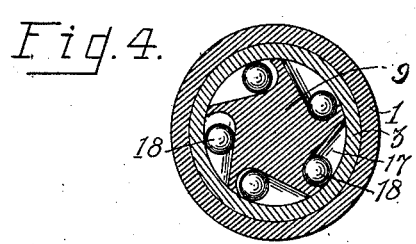 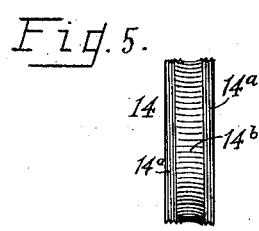
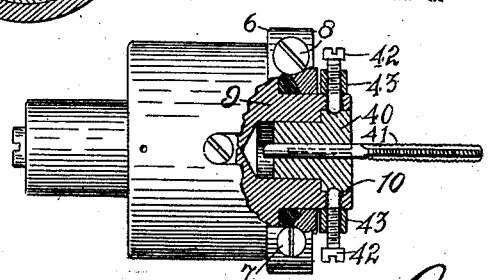
WITNESSES:
D. C. Walter
Ada E. Cameron
INVENTOR:
Charles Truman C. TRUMAN.
DIE AND TAP HOLDER FOR THREADING DEVICES FOR AUTOMATIC SCREW MACHINES.
APPLICATION FILED APR. 9, 1908.
985,231.
Patented Feb. 28, 1911.
2 SHEETS—SHEET 2.
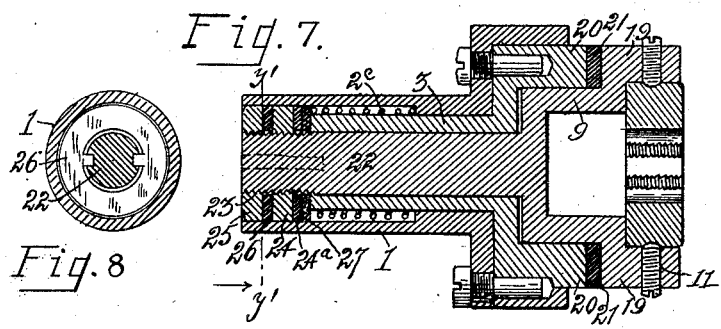
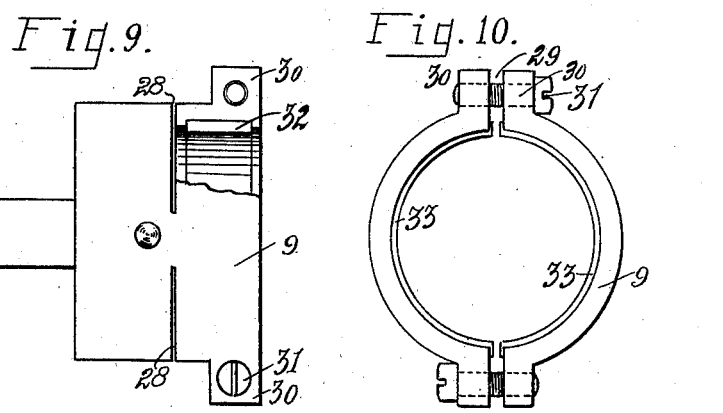
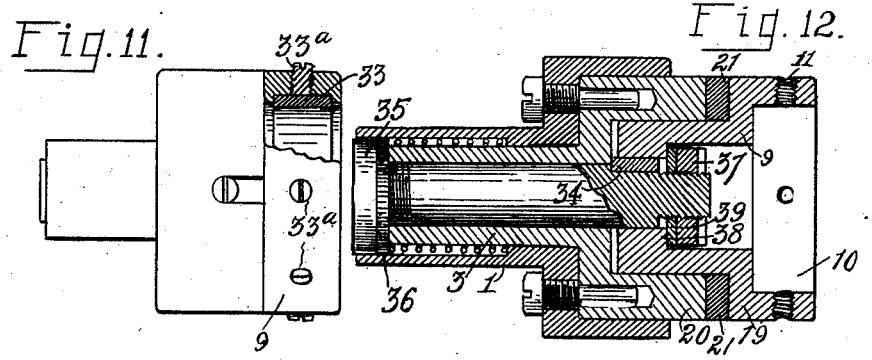
WITNESSES:
D. C. Walter
Ada E. Cameron
INVENTOR:
Charles Truman,

UNITED STATES PATENT OFFICE.

CHARLES TRUMAN, OF TOLEDO, OHIO, ASSIGNOR OF ONE-HALF TO CLYDE V. URSCHEL, OF TOLEDO, OHIO, AND JACOB W. URSCHEL, OF BOWLING GREEN, OHIO.

DIE AND TAP HOLDER FOR THREADING DEVICES FOR AUTOMATIC SCREW-MACHINES.

985,231.  Specification of Letters Patent.  Patented Feb. 28, 1911.

Application filed April 9, 1908. Serial No. 425,995.

*To all whom it may concern:*

Be it known that I, CHARLES TRUMAN, a citizen of the United States, residing at Toledo, in the county of Lucas and State of Ohio, have invented certain new and useful Improvements in Die and Tap Holders for Threading Devices for Automatic Screw-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to and its object is to provide means for yieldingly holding dies or taps so that the threading tools will not be broken or the threads upon the work marred when, during the cutting operation, the shoulder at the end of the cut is reached; also novel means for adjusting the friction of the die-holder and its resulting resistance to the torsion of the work; also a novel automatic clutch which, when the machine is reversed, holds the threading tool stationary while the work is unscrewed and withdrawn from the die or tap.

In machines of this character which are used for threading very small articles it is difficult to use dies and taps interchangeably by reason of the ring or socket-piece which holds the die in place not being thick and strong enough to properly support the collet or tap-holder.

A further object of my invention is to provide means for supporting and holding the tap which shall utilize the die-holder as a centering device and guide but which shall relieve the die-holder from undue strain and the thrust of the clamping screws.

I attain these objects by means of the devices and arrangement of parts hereinafter described and shown, and illustrated in the accompanying drawings in which,—

Figure 1 is a side-elevation of my holder arranged as a die-holder; Fig. 2, a central longitudinal sectional elevation of the same; Fig. 3, a transverse section of the same taken on line $x'—x'$, Fig. 2; Fig. 4, a transverse section of the same taken on line $x—x$, Fig. 2; Fig. 5, an edge-elevation of the compression-ring hereinafter referred to, detached and showing the external worm-gear and screw-threads hereinafter described; Fig. 6, a side-elevation of my holder with a portion broken away to show how it may be used interchangeably as a tap-holder; Fig. 7, a central longitudinal sectional elevation of a modified form of my device; Fig. 8, a transverse section on line $y'—y'$, Fig. 7; Fig. 9, a side-elevation of a further modification of my frictional device, with a portion broken away to show the recess designed for the reception of the die or the tap-holder; Fig. 10, a front-elevation of the same; Fig. 11, a further modification of the frictional device hereinafter referred to, and Fig. 12, a central longitudinal sectional elevation of a further modification of my device.

Like numerals of reference indicate like parts throughout the drawings.

In the drawings, 1 is a cylindrical casing or shell the neck 2 of which is adapted to be clamped or otherwise secured in the head of the machine or in a turret.

3 is an inner sleeve longitudinally movable in the case 1 and having radially projecting screw-heads 4 engaged with slots 5 in the outer casing, the heads and slots permitting the longitudinal movement of the part 3 but preventing its rotation.

In the part 2 is an axial socket $2^a$ through which passes a screw-bolt $2^b$ engaged with the inner end of the sleeve 3. Between the head of the screw $2^b$ and the bottom of the socket $2^a$ is interposed a spiral spring $2^c$ which holds the sleeve and the parts carried thereby normally retracted but which permits the movement of the sleeve 3 to and fro in the bore of the part 1. The forward part of the part 3 has a heavy flange or rim 6, split as at $6^a$, for a short distance to give the separated portions some resiliency and to permit them to be clamped upon the die or tap-holder presently to be described.

The inner periphery of the flange 6 is threaded, as at $6^b$. The separated parts of the split-rim 6 are bored at a right angle to the axis of the holder for the reception of a clamping screw 7 and an adjusting screw or worm 8, the bore for the latter screw being unthreaded.

9 is a cylindrical die-holder which fits into the bore of the sleeve 3 and which is designed to have a rotary movement independent of the sleeve and to be longitudinally movable with the sleeve. The forward part of the die-holder is recessed, as at 10, for the reception of a threading die or tap-holder of the usual or any preferred construction. The die may be secured in place by means of set-screws 11 passing through the flange of the die-holder as illustrated in Fig. 7. The inner end of the die-holder 9 is preferably conical as illustrated in Fig. 2, and between the conical end of the die-holder and the closed inner end of the sleeve 3 is interposed a disk 12 of "fiber" or other substance adapted to withstand frictional wear and abrasion. The object of the friction-disk 12 is to present such frictional resistance to the rotation of the die-holder as will permit the die or tap to perform its work, but should the die or tap cut too far or strike a shoulder or encounter such resistance as endangers the safety of the tool, the friction will be such that the die-holder will yield to the undue resistance of the work thus securing the tools against breakage. The frictional resistance is adjustable by means, preferably, of the devices clearly illustrated in Figs. 2 and 3 of the drawings in which 14 is an externally threaded ring adapted to be screwed into the internally threaded flange 6, the ring at its inner edge being concaved. On the die-holder is a shoulder 15 opposed to the concave portion of the ring 14, and between the shoulder and the concave portion of the ring is interposed a ring of "fiber" or similar substance 16 the purpose of which is to present further frictional resistance to the rotation of the die-holder. The ring 14 is not only threaded, as at 14$^a$, to take the internal thread of the flange 6, but is also spirally toothed as a worm-wheel, as at 14$^b$, (see Fig. 5), to receive the thread 8$^a$ of the adjusting screw 8. It will be seen that when the adjusting screw 8 is revolved by means of any suitable tool the ring 14 is also powerfully caused to revolve thus screwing the ring into its threaded socket and causing the two frictional members 12 and 16 to be powerfully clamped and compressed and to thus afford any desired amount of frictional resistance to the rotation of the die-holder. The desired amount of compression having been thus obtained, the worm-gear 8—14$^b$ would hold the parts in adjusted relation, but to relieve the strain upon this worm-gear, I also tighten up the clamping screw 7 to assist in maintaining the frictional adjustment.

It will be seen that the casing 1 stands fast in the head of a machine or a turret; that the sleeve 3 and the tool-holder 9 have longitudinal movement together as the tool moves forward onto the revolving work; that the pin secured to the sleeve 3 and projecting through the casing 1 prevents the rotation of the sleeve 3; that the frictional resistance afforded by the clamping devices and frictional surfaces holds the tool-holder 9 against rotation in the sleeve 3, except when the stress becomes great enough to injure either the tool or the work, and that the spring permits the forward movement of the sleeve 3 and the tool-holder 9, as the tool—governed by the thread which it is forming—moves onto the work, and, when the work is reversed to disengage the tool from the work, retracts the sleeve 3 and the tool-holder.

After the thread has been cut by the threading tool it becomes necessary to disengage the tool from the work. This is, in this class of machinery, effected by causing the work to revolve in a reverse direction while the cutting tool stands fast so that the work is unscrewed from the die or tap, the reversal being effected either manually or automatically. In case the frictional resistance above described should be insufficient to hold the die-holder against rotation during the reverse movement of the work I provide an automatic clutch which instantly and positively secures the die-holder against reverse rotation. This clutch is clearly illustrated in Figs. 2 and 4. In the periphery of the die-holder 10, near its inner end, is formed a circumferential series of recesses 17 for the reception of balls 18, these balls being true spheres and of hardened steel. The bottom or floor of each of the recesses 17 is arranged tangentially so that one end of the recess is deep enough to receive the ball and hold it out of contact with the inner surface of the sleeve 3 while the other end of the recess approaches the inner surface of the sleeve at a sharp angle as shown. When the die-holder 10 revolves to the left in Fig. 4, the balls will be carried in the deepest part of the recesses 17 and will be entirely out of contact with the inner surface of the sleeve 3 but should the die-holder 10 overcome the frictional resistance of the friction members herein before described and rotate in the opposite direction, then the balls will instantly travel outwardly and will be pinched between the floors of their recesses and the inner surface of the sleeve 3 forming a positive instant clutch which holds the die-holder rigidly against rotation so that the work may be unscrewed and released from the die or tap.

In Figs. 7 and 8 is illustrated a modification of my means for providing an adjustable friction resistance between the die-holder and its support. In this modification the die-carrier proper has an outwardly projecting flange 19 which is opposed to a corresponding flange 20 on the sleeve 3. Between these two flanges is interposed a friction-piece 21, of fiber or other suitable material. The rear extremity of the shank or shaft 22 of the die-holder is threaded, as at 23, on which is a nut 24 and a lock-nut 25 separated by a washer 26. Between the nut 24 and the rear end of the sleeve 3 is interposed a ring 27, of fiber or the like. The nut 24 and ring 27 are separated by washer 24ª. When the nut 24 is set up tight the die-holder is pulled inwardly and the sleeve 3 is forced forwardly thus pinching between them the fiber-ring 21, also pinching between the rear end of the sleeve 3 and the washer 24ª the fiber-ring 27, thus affording the desired frictional resistance to the rotation of the die-holder in its support.

In Figs. 9 and 10 is illustrated another modification of my frictional resistance to the rotation of the die-holder. In this modification the die-holder is cleft transversely at opposite sides, as at 28, (see Fig. 9), and is split longitudinally, as at 29, to give considerable resiliency to the forward end of the die-holder. The longitudinally separated portions have ears or lugs 30 engaged by clamping screws 31 by means of which the separated portions of the forward end of the die-holder may be powerfully compressed inwardly upon the die itself or the tap-holder. In this form of my device the inner circumference of the forward end of the bore of the die-holder is circumferentially channeled, as at 32, for the reception of strips 33 of fiber or the like which, when the clamping screws 31 are set up, closely embrace the periphery of the die or tap-holder. By means of the clamping screws 31 any desired adjustment of the friction between the die-holder and the die may be obtained.

In Fig. 11, the frictional member 33 is disposed as just described but the pressure of this member upon the periphery of the die or tap-holder is obtained by means of radial set-screws 33ª passing through the forward flange of the die-holder and abutting at their inner ends against the friction piece.

In Fig. 12 the die-holder proper and its sleeve are flanged as already described with reference to Fig. 7 and between these two flanges are compressed the fiber washer 21. In this instance, however, the shank or shaft of the die-holder is formed separately from the die-holder and they are held in rotative relation by means of a spline or feather 34. On the rear end of the shaft or shank of the die-holder is a head 35 between which and the sleeve 3 is a fiber-ring or washer 36. The forward end of the shank or shaft of the die-holder is threaded for the reception of a nut 37 between which and an internal shoulder 38 on the die-holder is interposed a washer 39. When the nut 37 is set up the friction-pieces 21 and 36 are pinched between the opposing faces of the sleeve and die-holder and the sleeve and the head 35, so that any desired frictional resistance to the rotation of the part 9 may be obtained.

The operation of my device thus far described is as follows: The parts being assembled as illustrated and described and the casing 1 being secured in the head of the machine or in a turret; the die-holder being supplied with a die as in Fig. 7, or a tap-holder as illustrated in Fig. 6, and the work to be threaded being caused to revolve and being presented to the threading tool, now as the thread is cut upon the work, the tool engaging the thread is caused to move toward the work, the spring 2ᶜ yielding to the forward outward movement of the tool. When the shoulder or root of the thread is reached, ordinarily, close attention is required to prevent the jamming of the tools and the work and the breaking of the tools and spoiling of the thread. In my device this difficulty is overcome by the adjusted friction which permits the work and the die-holder to revolve together without injuring either the tool or the thread until the machine is reversed to unscrew the tool from the work. Now, the reverse movement of the work tends to revolve with it the tool but at this instant the balls 18 in the ball clutch move outwardly and are wedged between the converging surfaces of their recesses and the inner surface of the sleeve 3, thus holding the die-holder in rigid engagement with the non-revoluble sleeve and thus insuring the complete release of the work from the tool without injury to either the thread or the tool. In threading small articles or articles formed of soft metal the clutch above described may be omitted but in general practice the clutch is found to be highly efficient and useful.

The tap-holder or collet 40, shown in Fig. 6, fits exactly the recess designed for the reception, interchangeably, of the die. The tap-holder is split longitudinally to permit the compression of the collet upon the tap 41. The flange of the die-holder, surrounding the die-recess in the die-holder, is too thin to be properly threaded for the clamping screws 42, but is sufficiently strong to hold the die or tap-holder against rotation. To give the screws 42 a sufficient threaded support I provide a ring or sleeve 43 of considerable thickness which slips with a snug fit over the cylindrical end of the die-holder. Through the ring, radially, are tapped threaded holes for the reception of the screws 42 which holes coincide with the threaded holes designed for the set-screws 11. The ring 43 is stout enough to withstand the thrust of the compression screws 42 and is readily removable to admit of the assembling of the friction-devices hereinbefore described.

Having described my invention, what I claim and desire to secure by Letters Patent is,—

1. In a device of the described character, a tool-holder, a sleeve for the tool-holder, said two members having frictionally opposed surfaces, the sleeve having a diametrically split internally threaded flange, a nut having external threads adapted to take the internal threads of said flange, said nut having a surface frictionally opposed to a corresponding surface upon the tool-holder, said nut being also externally toothed as a worm-gear, a clamping nut engaged with the opposed split portions at one side of said flange, and a worm-bolt engaged with the opposed split portions at the opposite side of said flange and with said worm-gear.

2. In a device of the described character, a holder in which the cutting tool may be secured, a sleeve in which the holder is revoluble, an annular compression-nut surrounding the holder and opposed to a shoulder on the holder, said compression-nut being threaded externally to take an internal thread on the sleeve, being also externally toothed as a worm-gear, and a worm-bolt engaged with the teeth, the arrangement being such that the rotation of the worm-bolt revolves the annular compression-nut and governs the frictional resistance to the rotation of the holder.

3. In a device of the described character, a holder in which the cutting tool may be secured, a sleeve in which the holder is revoluble, a casing in which the sleeve is secured against rotation and is movable longitudinally, and an annular compression-nut surrounding the holder and opposed to a corresponding part on the holder.

4. In a device of the described character, a holder in which the cutting tool may be secured, a sleeve in which the holder is revoluble, and a casing in which the sleeve is secured against rotation and is movable longitudinally, said sleeve and said tool-holder having opposed frictional surfaces, a friction member arranged to receive the thrust of said frictional surfaces, and means for adjusting the friction between said frictional surfaces and friction member.

5. In a device of the described character, a holder for the support of a cutting tool, a support in which the holder is revoluble, friction-devices for resisting the axial movement of the holder, and means for the adjustment of such friction comprising an annular compression-nut having its periphery threaded at its two margins and having its periphery toothed between said two threaded portions as a worm-gear, an internally threaded member adapted for the reception of said marginal threads, and a threaded bolt revolubly supported in operative engagement with such worm-gear.

6. In a device of the described character, a revolubly supported tool for cutting threads, and means for frictionally resisting the rotation of the tool, said means including an annular compression-nut, adapted for frictional engagement with a tool-holder, said nut having two threads of different leads, and a worm driving member engaged with one of said threads, the other thread being adapted for engagement with a tool-holder support.

7. In combination, a holder for a thread cutting tool, a sleeve in which the holder is journaled and is free to revolve in one direction, a clutch which engages the holder in its opposite rotation, a casing in which the sleeve is secured against rotation and is movable longitudinally, means for holding the sleeve normally retracted, devices for frictionally resisting the rotation of the holder, and means for the adjustment of such frictional resistance.

8. In a device of the described character, a tool-holder (9) having a flanged recess,—the flange having radial apertures for set-screws,—and a removable collar (43) adapted to embrace said flange and having radial apertures coincident with the apertures first mentioned.

In testimony whereof I affix my signature in presence of two witnesses.

CHARLES TRUMAN.

Witnesses:
CLAYTON MURPHY,
ADA E. CAMERON.

---

Copies of this patent may be obtained for five cents each, by addressing the "Commissioner of Patents, Washington, D. C."